United States Patent [19]

Akimoto et al.

[11] Patent Number: 4,476,919
[45] Date of Patent: Oct. 16, 1984

[54] AIR CONDITIONING APPARATUS FOR AUTOMOBILES

[75] Inventors: Ryosaku Akimoto; Yukio Yoshida; Nobuaki Ito, all of Nagoya, Japan

[73] Assignees: Mitsubishi Jukogyo Kabushiki Kaisha, Tokyo; Churyo Engineering Co., Ltd., Nagoya, both of Japan

[21] Appl. No.: 327,168

[22] Filed: Dec. 2, 1981

[30] Foreign Application Priority Data

Dec. 12, 1980 [JP] Japan .......................... 55-178385[U]

[51] Int. Cl.³ ............................................ F25B 29/00
[52] U.S. Cl. ........................................ 165/28; 165/30; 165/42; 62/229; 62/244
[58] Field of Search ................... 165/43, 28, 42, 30; 62/229, 323.4, 239, 244; 236/91 R

[56] References Cited

U.S. PATENT DOCUMENTS

| 3,315,730 | 4/1967 | Weaver et al. | 165/28 |
| 4,323,111 | 4/1982 | Iijima | 62/180 |
| 4,337,818 | 7/1982 | Franz | 165/28 |
| 4,356,705 | 11/1982 | Sutoh et al. | 62/229 |
| 4,358,936 | 11/1982 | Ito et al. | 62/323.4 |

Primary Examiner—Allen M. Ostrager
Attorney, Agent, or Firm—Toren, McGeady and Stanger

[57] ABSTRACT

An air conditioning apparatus for an automobile having a compartment comprises a cooling unit including an evaporator for cooling air, a heater for heating a portion of the cooled air, an air mixing damper for mixing the cooled air with the heated portion thereof and introducing the mixture into the compartment of the automobile, a control device for controlling the air mixing damper based on temperatures inside and outside of the compartment to keep the former at a constant temperature, a variable resistor connected operatively to the air mixing damper, and a temperature detector for detecting the temperature of the evaporator or the temperature of the cooled air supplied therefrom, the control device being responsive to an output of the variable resistor and the temperature detector for changing an operation command signal for the cooling unit.

5 Claims, 6 Drawing Figures

AIR CONDITIONING APPARATUS FOR AUTOMOBILES

BACKGROUND OF THE INVENTION

1. Field of the Invention

The present invention relates to an air conditioning apparatus for automobiles.

2. Prior Art

Known air conditioning apparatus comprise a cooling unit including an evaporator for cooling air, a heater for heating part of the cooled air, an air mixing damper for mixing the cooled air with the heated part thereof and introducing the mixture into a compartment of an automobile, and a control device for controlling the air mixing damper based on temperatures inside and outside of the compartment to keep the former at a constant temperature. The conventional air conditioning apparatus also include a thermostat which has a fixed set value. With the fixed thermostat, when the cooling load becomes smaller, it is necessary to reheat the cooled air, with the result that the energy required for cooling the air as reheated is wasted and an unwanted loss of power results.

SUMMARY OF THE INVENTION

It is an object of the present invention to provide an air conditioning apparatus for automobiles which is an energy saver capable of cooling control dependent on the cooling load.

Another object of the present invention is to provide an air conditioning apparatus for automobiles which can effect automatic cooling control without involving a wasteful cooling operation.

Still another object of the present invention is to provide an air conditioning apparatus for automobiles which requires a minimum number of parts added to conventional air conditioning apparatus and which can be manufactured substantially at the same cost as that of known air conditioning apparatus.

According to the present invention, an air conditioning apparatus for an automobile having a compartment comprises a cooling unit including an evaporator for cooling air, a heater for heating part of the cooled air, an air mixing damper for mixing the cooled air with the heated part thereof and introducing the mixture into the compartment of the automobile, a control device for controlling the air mixing damper based on temperatures inside and outside of the compartment to keep the former at a constant temperature, a variable resistor connected operatively to the air mixing damper, and a temperature detector for detecting the temperature of the evaporator or the temperature of the cooled air supplied therefrom, the control device being responsive to an output of the variable resistor and the temperature detector for changing an operation command signal for the cooling unit.

The above objects, features and advantages of the present invention will become more apparent from the following description when taken in conjunction with the accompanying drawings.

DETAILED DESCRIPTION

Figure 1:
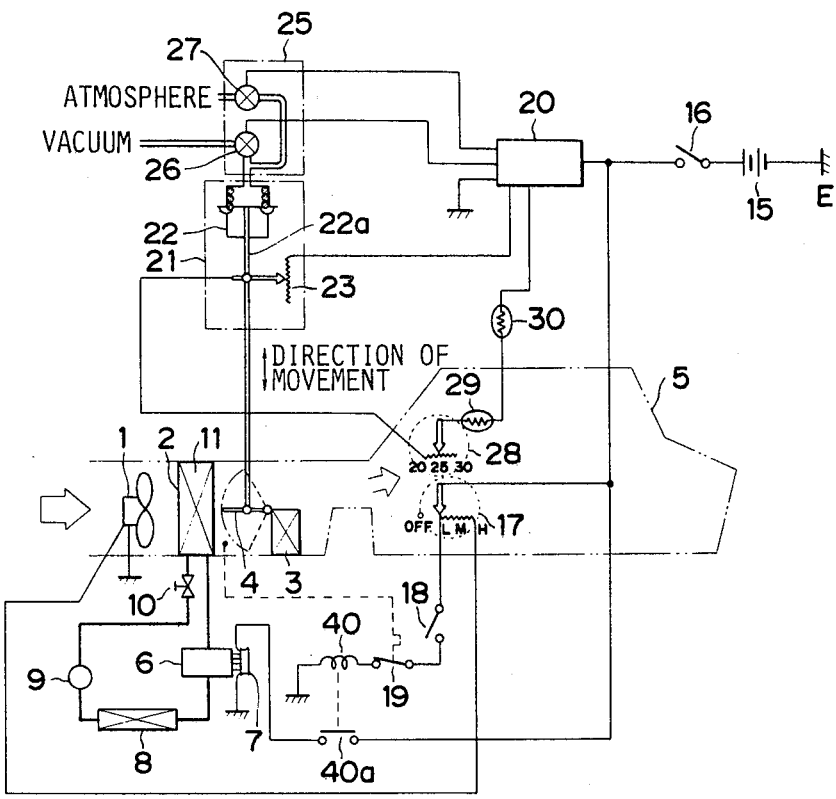
FIG. 1 is a systematic view of a conventional air conditioning apparatus for an automobile.
Figure 2:
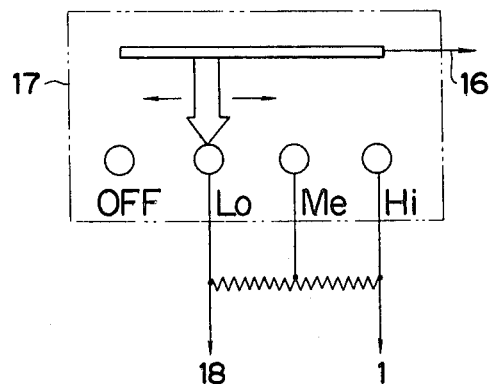
FIG. 2 is an enlarged view of a fan control switch in the air conditioning apparatus illustrated in FIG. 1.

As shown in FIGS. 1 and 2, a conventional air conditioning apparatus comprises an air cooling unit 2 and a heater 3, through which air is forced by a fan or air blower 1 to pass, the fan 1 being energizable by a power supply 15 turned on by an ignition switch 16 and controlled for an amount of air to be supplied by a fan control switch 17 located within a compartment 5 of an automobile in which the air conditioning apparatus is installed. The cooling unit 2 comprises a coolant circuit composed of a compressor 6, condenser 8, a liquid receiver 9, an expansion valve 10, and an evaporator 11. The compressor 6 is coupled with a magnetic clutch 7 which is connected to the power supply 15 via the fan control switch 17, a switch 18 for the air conditioning apparatus, a thermostat 19 for controlling the cooling unit 2, and a relay 40 having a contact 40a. When the switches 16, 17 and the thermostat 19 are closed, the relay 40 is energized to close the relay contact 40a, whereupon the compressor 6 is actuated to cause a coolant to circulate through the coolant circuit of the cooling unit 2. A portion of air cooled by the cooling unit 2 is caused to pass through the air mixing damper 4 and be heated again by the heater 3. The heated air is mixed with the cooled air, and the mixture is supplied into the compartment 5 of the automobile.

The air conditioning apparatus also includes an outside temperature sensor 30 disposed outwardly of the compartment 5, a compartment temperature sensor 29 installed within the compartment 5, a compartment temperature setting device 28 that can be set by a passenger in the compartment 5, and a potentiometer 23 in a power servo 21. Output voltages from the sensors 30, 29, the setting device 28, and the potentiometer 23 are applied to a control device 20 which comprises voltage comparators in which these output voltages are compared with reference voltages. When the compartment temperature is higher than a set temperature, the control device 20 opens a valve 27 in a dual valve assembly 25, the valve 27 being vented to atmosphere. Conversely, when the compartment temperature is lower than the set value, a valve 26 in the dual valve assembly 25 is opened by the control device 20, the valve 26 being in communication with a source of vacuum (not shown). Actuation of the valves 26, 27 causes a pressure in a vacuum actuator 22 in the power servo 21 to change, moving the air mixing damper 4 mechanically linked with the vacuum actuator 22 through a rod 22a to control the temperature of air supplied into the compartment 5, that is, to raise and lower the temperature of supplied air, respectively. On actuation of the air mixing damper 4, the resistance of the potentiometer 23 ganged with the power servo 21 and hence the temperature in the compartment vary, and a change in the compartment temperature is fed back to the control device 20 for automatically controlling the compartment temperature to reach the set value.

The thermostat 19 detects the temperature of air supplied from the evaporator 11 or the temperature of the evaporator 11 to turn the cooling unit 2 on and off for keeping the compartment temperature at a value set by the thermostat 19. The value set by the thermostat 19 is generally fixed, so that when the cooling load becomes smaller and the air mixing damper 4 is displaced in a direction to render supplied air hotter, it is necessary to reheat the cooled air. Thus, the energy required to cool the air which is heated again by the heater 3 is wasted, and hence results in an unnecessary loss of power.

One proposal to cope with this problem would be a variable thermostat 19. However, such an arrangement would require a controller for the variable thermostat, and the operator would have to adjust the temperature setting device 28 and the thermostat controller, so that an operation is awkward and offsets the advantage of automatic air conditioning.

Figure 3:
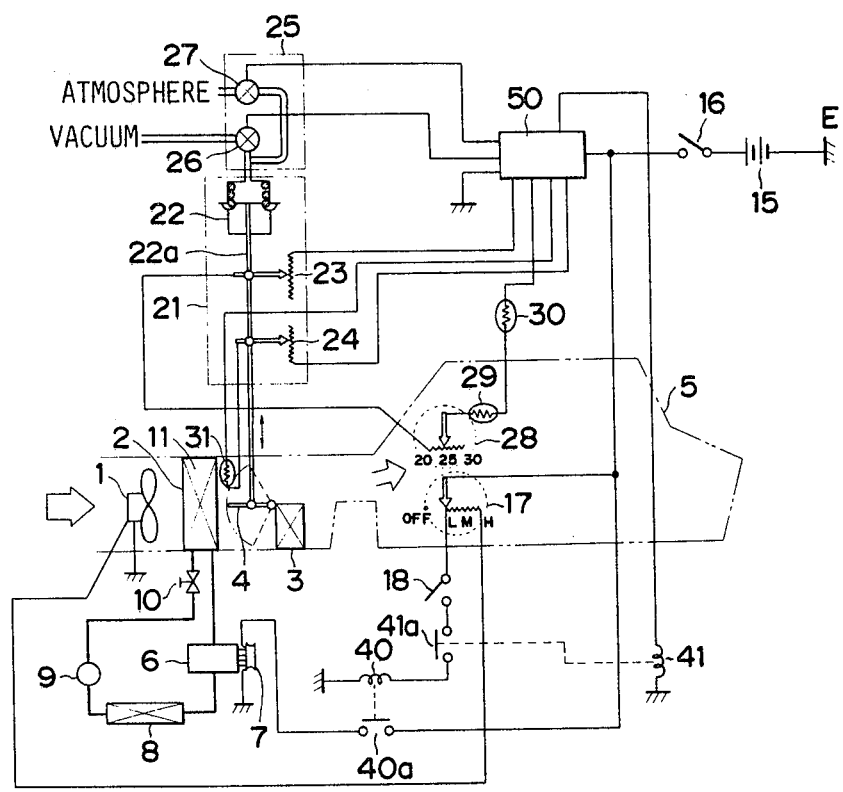
FIG. 3 is a systematic view of an air conditioning apparatus constructed in accordance with the present invention.

The present invention will now be described with reference to FIGS. 3 and 4. Identical parts are denoted by identical reference numerals in FIGS. 1 through 4.

An air conditioning apparatus according to the present invention is different from the air conditioning apparatus shown in FIG. 1 in that the thermostat 19 is replaced with a relay 41, and a cooling unit controlling potentiometer 24 and an evaporator sensor 31 are added. The potentiometer 24 and the evaporator sensor 31 are connected in series with each other, and are coupled to the relay 41 through a voltage comparator 39 (FIG. 4). The other structural details of the air conditioning apparatus of the invention are the same as those of the air conditioning apparatus illustrated in FIGS. 1 and 2, and hence will not be repeated.

The potentiometer 24 for controlling the cooling unit 2 is in the form of a variable resistor which is connected operatively to the rod 22a of the vacuum actuator 22 so as to be variable in resistance in response to movement of the rod 22a. More specifically, when the vacuum actuator 22 actuates the air mixing damper 4 in a direction to make supplied air hotter, the resistance of the variable resistor 24 is increased. Conversely, as the air mixing damper 4 is displaced in a direction to make supplied air cooler, the resistance of the variable resistor 24 is reduced.

The evaporator sensor 31 comprises a temperature sensor disposed adjacent to the evaporator 11 for detecting the temperature of the evaporator 11 or the temperature of the cooled air supplied from the evaporator 11. The evaporator sensor 31 has an electrical resistance which is reduced when the temperature of the evaporator 11 or the temperature of the air supplied therefrom is increased, and which is increased when the temperature of the evaporator 11 or that of the air delivered therefrom is lowered.

Output voltages from the potentionmeter 24 and the evaporator sensor 31 are supplied to a control device 50 (FIG. 3), which produces an output to energize the relay 41 for controllable actuation of the magnetic clutch 7 by which the compressor 6 is drivable. Thus, the thermostat shown in FIG. 1 can be dispensed with.

Figure 4:
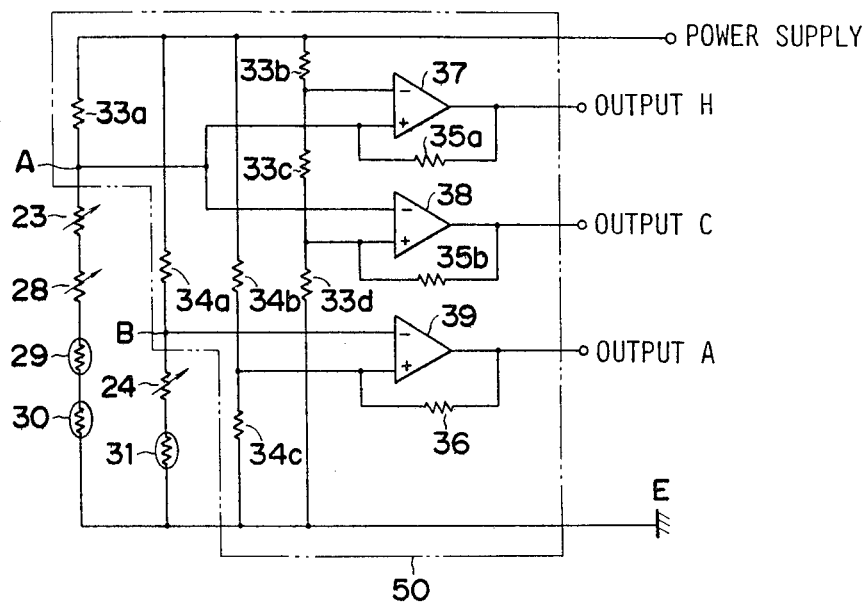
FIG. 4 is a circuit diagram of a control device in the air conditioning apparatus shown in FIG. 3.

As illustrated in FIG. 4, the control device 50 comprises voltage comparators 37, 38 which are supplied with a combined output from the outside temperature sensor 30, the compartment temperature sensor 29, the temperature setting device 28, and the potentiometer 23. The voltage comparator 37 produces an output H for actuating the valve 26 in the dual valve assembly 25, and the voltage comparator 38 produces an output C for actuating the valve 27 in the dual valve assembly 25.

A combined output from the evaporator sensor 31 and the potentiometer 24 is applied to an input of the voltage comparator 39.

The control device 50 also includes fixed resistors 33a, 33b, 33c, 33d, 34a, 34b, 34c constituting bridges for control signals, and fixed resistors 35a, 35b, 36 for controlling offset voltages.

In operation, the ignition switch 16 is turned on and the fan control switch 17 is actuated to energize the fan 1 for blowing air toward the evaporator 11. The switch 18 is also turned on to put the cooling unit 2 into operation through the relays 40, 41. A combined voltage across the outside temperature sensor 30, the compartment sensor 29, the temperature setting device 28, and the potentiometer 23 indicative of the position of the air mixing damper 4 is supplied to the control device 50.

When the compartment temperature is higher than a temperature set by the setting device 28, the resistance of the compartment temperature sensor 29 is lowered to reduce a potential at the point A shown in FIG. 4 to a point where the voltage comparator 38 is energized to produce an output C. The output C from the comparator 38 opens the valve 27 in the dual valve assembly 25 to thereby actuate the vacuum actuator 22 in the power servo 21, moving the rod 22a downwardly. At this time, the air mixing damper 4 is actuated in a direction to admit more cooled air so that the temperature of air supplied into the compartment 5 is lowered. The resistance of the potentiometer 23 ganged with the vacuum actuator 22 is increased, and the resistance of the compartment temperature sensor 29 is also increased due to a reduction in the temperature of the air fed into the compartment 5, until the potential at the point A is increased to de-energize the voltage comparator 38.

Conversely, when the compartment temperature is lower than the set temperature, the voltage comparator 37 produces an output H due to a higher potential at the point A, whereupon the valve 26 in the dual valve assembly 25 is actuated to displace the air mixing damper 4 in a direction to cause more air to flow toward the heater 3. Thus, the temperature of air supplied into the compartment 5 is increased, with the results that the resistances of the potentiometer 23 and the compartment temperature sensor 29 are reduced until the potential at the point A is reduced to de-energize the voltage comparator 37.

The foregoing operation of the air conditioning apparatus is repeated for optimum control of the temperature of air in the compartment 5. Similar temperature control can be effected by the outside temperature sensor 30 when the temperature outside of the compartment 5 is higher or lower than the set temperature.

Simultaneously with the above operation for controlling the temperature in the compartment 5, the potentiometer 24 is actuated by the vacuum actuator 22 such that the resistance of the potentiometer 24 will be increased when the air mixing damper 4 is displaced to supply hotter air, and will be reduced when the air mixing damper 4 is displaced to supply cooler air.

As the air mixing damper 4 is moved to admit hotter air when the compartment temperature or the temperature outside of the compartment is lowered, the rod 22a is shifted upwardly to increase the resistance of the potentiometer 24, whereupon the potential at the point B shown in FIG. 4 becomes higher than a reference voltage applied to the voltage comparator 39, which is then de-energized. The relay 41 is now de-energized to open the contact 41a thereof, and the magnetic clutch 7 is de-energized to stop the compressor 6.

Upon stoppage of the compressor 6, the temperature at the evaporator sensor 31 is gradually increased and the resistance thereof is reduced until the potential at the point B, or the input voltage to the comparator 39 is smaller than the reference voltage therein. At this time, the voltage comparator 39 generates an output A again to start operating the compressor 6. Therefore, as the air mixing damper 4 is displaced in a direction to supply hotter air, the threshold temperature for the compressor 6 at which the latter starts operating becomes higher. No unwanted cooling operation of the cooling unit 2 is carried out, and hence an energy loss is avoided.

When the air mixing damper 4 is actuated to let in cooler air due to an increase in the compartment temperature or the temperature outside of the compartment 5, the resistance of the potentiometer 24 is reduced and hence the potential at the point B is lower than the reference voltage. The cooling unit 2 continues to operate as the output A from the voltage comparator 39 keeps the compressor 6 actuated until the temperature at the evaporator 31 is lowered and its resistance is increased to a point where the increase in the resistance of the evaporator 31 and the reduction in the resistance of the potentiometer 24 are balanced to cause the potential at the point B to reach the reference voltage. As the air moving damper 4 is displaced in a direction to supply cooler air, therefore, the threshold temperature for the compressor 6 is lowered for continuously supplying necessary cooled air.

Figure 5:
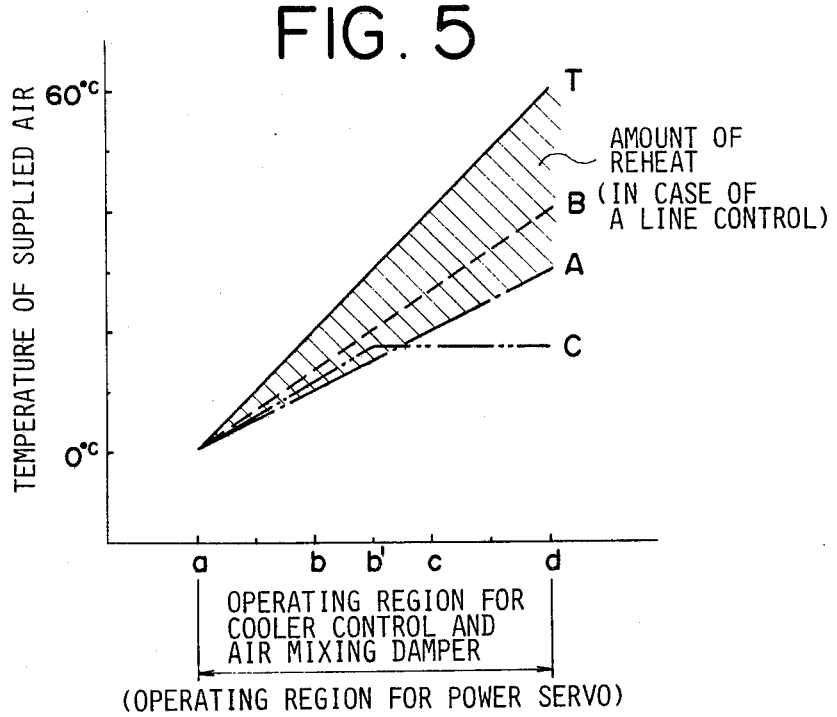
FIG. 5 is a graph showing a relationship between controlled temperatures of air supplied from an evaporator and degrees of opening of an air mixing damper in the air conditioning apparatus illustrated in FIG. 3.

FIG. 5 illustrates a relationship between temperatures of supplied air and temperature control for supplied air through the evaporator 11 and degrees of opening of the air mixing damper 4. Supplied air is the coolest at the point a, and the hottest at the point d with the temperature being variable at the points b and c. The straight line T approximates temperatures of air introduced into the compartment 5, whereas the lines A, B, and C indicate temperatures of air supplied from the evaporator 11 as the resistance of the potentiometer 24 is varied.

Upon control by the line A, for instance, a hatched area defined between the straight lines T and A shows an amount of reheating of air by the heater 3. A study of FIG. 5 indicates that as the operating position of the air mixing damper 4 approaches the point d in response to a reduction in the cooling load, the threshold temperature at which the compressor 6 begins to operate is automatically raised to increase the temperature of air supplied from the evaporator 11, and, conversely, as the cooling load is increased to cause the operating position of the air mixing damper 4 to approach the point a, the threshold temperature for the operation of the compressor 6 is automatically lowered to reduce the temperature of air delivered from the evaporator 11.

Figure 6:
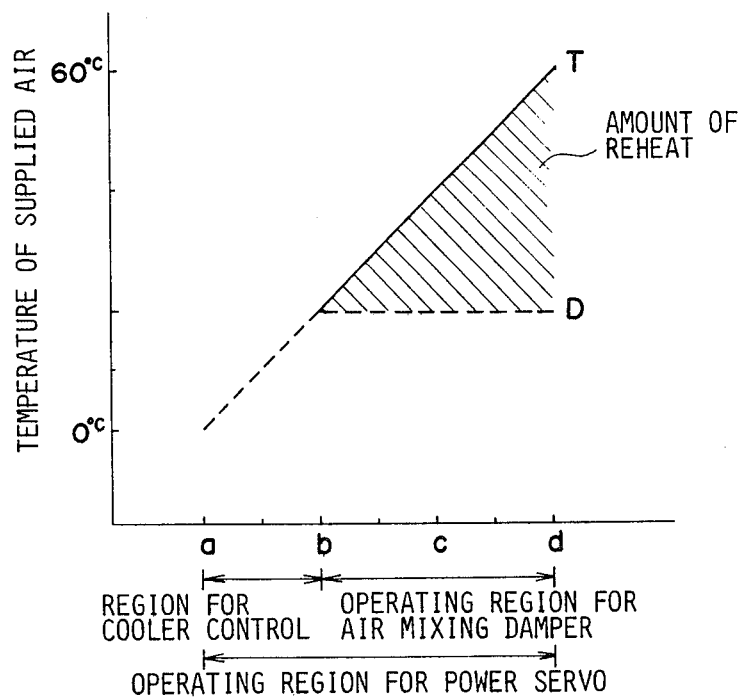
FIG. 6 is a graph showing temperatures of supplied air plotted against an operating region for a power servo.

FIG. 6 shows an operating region for the power servo 21 or the vacuum actuator 22 against temperatures of air supplied. The interval between the points a and b is indicative of control by the evaporator 11 of the temperature of supplied air, and the interval between the points b and d indicates control of the temperature of supplied air through reheating of the latter upon actuation of the air mixing damper 4.

As described above, the air conditioning apparatus according to the present invention can effect optimum cooling operation dependent upon the cooling load since as the cooling load is reduced to displace the air mixing damper 4 in a direction to supply hotter air, the operating temperature for the compressor 6 is automatically raised, and as the cooling load is increased to move the air mixing damper 4 in a direction to supply cooler air, the operating temperature for the compressor 6 is automatically lowered.

The air conditioning apparatus of the present invention has the following advantages:

(1) The air conditioning apparatus of the invention is capable of controlling its cooling capability dependent upon the cooling load and hence prevents unwanted wasteful cooling operation. Thus, the air conditioning apparatus of the invention is a more effective energyy saver than prior air conditioning apparatus.

(2) The cooling capability can be controlled through automatic fine adjustment.

(3) The air conditioning apparatus of the invention can be manufactured by changing or adding a minimum number of parts in or to known air conditioning apparatus, and can be built substantially at the same cost as that of conventional air conditioning apparatus.

Although a certain preferred embodiment has been shown and described in detail, it should be understood that many changes and modifications may be made therein without departing from the scope of the appended claims.

What is claimed is:

1. An air conditioning apparatus for an automobile having a compartment, comprising:
   means forming an air flow path opening into said compartment and having an upstream end and a downstream end;
   an air cooling unit including a compressor and an evaporator with said evaporator located in the air path adjacent the upstream end of said air flow path for supplying cooled air;
   a heater located within said air flow path downstream from said evaporator for heating a portion of the cooled air from said air cooling unit;
   an air mixing damper in said air flow path located between said evaporator and said heater for selectively bypassing a portion of the cooled air from said evaporator over said heater and then introducing the mixture of the cooled air and bypassed heated air into the compartment of the automobile;
   first means for sensing the temperature outside the compartment of the automobile and second means for sensing the temperature inside the compartment;
   means forming a control device for controlling said air mixing damper based on temperatures sensed by said first and second means inside and outside of the compartment to keep the inside temperature of the compartment at a constant temperature;
   means for actuating said air mixing damper;
   a variable resistor connected operatively to said air mixing damper; and
   a temperature detector for detecting the temperature of said evaporator or the temperature of the cooled air supplied therefrom and having an electrical resistance, said means forming the control device being responsive to the voltage across said variable resistor and said temperature detector in series for controlling said compressor based on a signal proportional to the series resistance of said variable resistor and to the resistance of said temperature detector.

2. An air conditioning apparatus according to claim 1, said means forming a control device being arranged in such a manner that as the temperature in the compartment is reduced and said air mixing damper is actuated in a first direction to supply hotter air, said cooling device will start operating at a higher temperature, and as the temperature in the compartment is increased and said air mixing damper is actuated in a second direction to supply cooler air, said cooling device will start operating at a lower temperature.

3. An air conditioning apparatus according to claim 2, wherein the resistance of said variable resistor will be increased when said air mixing damper is actuated in said first direction, and will be reduced when said air mixing damper is actuated in said second direction.

4. An air conditioning apparatus according to claim 2, wherein the electrical resistance detector will be reduced when said temperature of the evaporator or said temperature of the cooled air supplied therefrom is increased, and will be increased when said temperature of the evaporator or said temperature of the cooled air supplied therefrom is reduced.

5. An air conditioning apparatus according to claim 2, said means forming a control device including a voltage comparator comparing the voltage across said variable resistor and said temperature detector in series connection with a reference voltage, the arrangement being that when the signal proportional to the series resistance of the variable resistor and the temperature detector exceeds the level of a reference signal the compressor is stopped and when the signal is below the level of the reference signal the compressor will be operated.

* * * * *